(12) United States Patent
Tebbe et al.

(10) Patent No.: US 6,498,225 B2
(45) Date of Patent: Dec. 24, 2002

(54) POLYCARBODIIMIDE-BASED BLOCK COPOLYMERS, A METHOD OF PREPARING THEM AND THEIR USE AS HYDROLYSIS STABILIZERS

(75) Inventors: Heiko Tebbe, Ketsch (DE); Ludger Heiliger, Neustadt (DE); Volker Müller, Philippsburg (DE)

(73) Assignee: Rhein Chemie Rheinau GmbH, Mannheim (DE)

( * ) Notice: Subject to any disclaimer, the term of this patent is extended or adjusted under 35 U.S.C. 154(b) by 0 days.

(21) Appl. No.: 09/813,198

(22) Filed: Mar. 20, 2001

(65) Prior Publication Data

US 2001/0037010 A1 Nov. 1, 2001

(30) Foreign Application Priority Data

Mar. 29, 2000 (DE) .......................... 100 15 658

(51) Int. Cl.$^7$ .................. C08L 75/02; C08L 77/12; C09K 5/18; C09K 5/29
(52) U.S. Cl. ............... 528/170; 528/80; 528/81; 528/83; 528/272; 525/131; 525/420; 525/424; 525/437; 525/440; 525/457; 525/907
(58) Field of Search .................. 528/80, 272, 81, 528/83, 170; 525/907, 131, 420, 424, 437, 440, 457

(56) References Cited

U.S. PATENT DOCUMENTS

| | | | | |
|---|---|---|---|---|
| 2,941,983 A | * | 6/1960 | Smeltz ................. | 260/77.5 |
| 5,210,170 A | * | 5/1993 | Quiring et al. ........... | 528/80 |
| 5,614,483 A | * | 3/1997 | Fessenbecker et al. ..... | 508/550 |
| 6,211,293 B1 | * | 4/2001 | Nakamura et al. ......... | 525/131 |

FOREIGN PATENT DOCUMENTS

| | | | |
|---|---|---|---|
| DE | 1130594 | | 5/1962 |
| DE | 198 21 666 | * | 11/1999 |
| EP | 940 389 | * | 9/1989 |
| GB | 940804 | | 11/1963 |
| GB | 986200 | * | 3/1965 |
| GB | 1083410 | * | 9/1967 |
| GB | 1332607 | * | 10/1973 |

OTHER PUBLICATIONS

Angew. Chem., English language translation, vol. 1, No. 12, (month unavailable) 1962, pp. 621–625, W. Neumann et al, "The Preparation of Carbodiimides from Isocyanates" the Month in the Date of Publication is Unavailable.*

Kunstatoff Handbuch, vol. 7, 3rd ed. (month unavailable) 1993, pp. 11–15, 58–65, 67–71, 104–110, D. Dieterich et al, "Grundlagen der Polyurethanchemie und Sondergebiete" the Month in the Date of Publication is Unavailable.*

Chemical Reviews, vol. 81(6), Dec. 1981, pp. 589–636, A. Williams et al, "Carbodiimide Chemistry: Recent Advances" the Month in the Date of Publication is Unavailable.*

* cited by examiner

Primary Examiner—P. Hampton-Hightower
(74) Attorney, Agent, or Firm—Joseph C. Gil; Noland J. Cheung; Jennifer R. Seng

(57) ABSTRACT

The invention relates to carbodiimide-based block copolymers, a method of preparing them and also their use as hydrolysis stabilizers in ester-group-containing polymers. The advantages of the block copolymers according to the invention are, in particular, their high efficiency at low dosage as hydrolysis protection in ester-group-containing polymers, and also their nontoxic behavior, their high thermal stability and their good compatibility during incorporation in the polymeric matrix of the polymers to be protected.

6 Claims, No Drawings

POLYCARBODIIMIDE-BASED BLOCK COPOLYMERS, A METHOD OF PREPARING THEM AND THEIR USE AS HYDROLYSIS STABILIZERS

FIELD OF THE INVENTION

The invention relates to novel polycarbodiimide-based block copolymers, a method of preparing them and also their use as hydrolysis stabilizers in ester-group-containing polymers.

BACKGROUND OF THE INVENTION

Organic carbodiimides are known. Their chemistry and their preparation are described, for example, in Chemical Reviews, vol. 81 (1981), pages 589 to 639 and Angewandte Chemie 74 (1962), pages 801 to 806.

Monocarbodiimides and oligomeric polycarbodiimides can be prepared, for example, by the action of basic catalysts on mono- or polyisocyanates. Suitable as basic catalysts are, for example, heterocyclic, phosphorous-containing compounds in accordance with GB-A-1 083 410 and phospholenes and phospholidines as specified in DE-B-11 30 594 and also their oxides and sulfides.

Furthermore, polycarbodiimides having terminal urethane groups are described, for example, in U.S. Pat. No. 2,941,983 and DE-B-22 48 751. The products can be prepared, for example, by carbodiimidization of diisocyanates with sterically hindered isocyanate groups and subsequent partial or complete urethanation of the terminal NCO groups with alcohols. As described in DE-A-2 248 751, if aromatic diisocyanates having isocyanate groups with different reactivity are used, the isocyanate groups having higher reactivity with alcohol may be partially or completely converted into the corresponding urethane groups and the remaining isocyanate groups may be reacted to form carbodiimide groups with the elimination of carbon dioxide.

The carbodiimides and polycarbodiimides are preferably used as stabilizers to prevent the hydrolytic cleavage of polyester-based plastics. According to the specifications of DE-A-14 94 009, aromatic and/or cycloaliphatic monocarbo-diimides, in particular, are suitable for this purpose that are substituted in position 2 and 2', such as 2,2',6,6'-tetraisopropyidiphenylcarbodiimide. Polycarbodiimides having a molecular weight of over 500 and a content of more than 3 carbodiimide groups are described in DE-B-12 85 747 as stabilizers to counteract the effects of heat and moisture in ester-group-containing plastics.

Although a substantial stability of ester-group-containing plastics with respect to moist heat, water and water vapor can be achieved by adding said (poly)carbodiimides as stabilizers, the products also have disadvantages. A disadvantage of the tetraalkyl-substituted monocarbodiimides, such as, for example, 2,2',6,6'-tetraisopropyldiphenylcarbodiimide, preferably used industrially, is their relatively high vapor pressure and their tendency as a result of the low molecular weight to migrate out of the polyaddition products, for example thermoplastic polyurethanes (TPU) or polycondensation products, for example polyterephthalates. To eliminate this deficiency, according to the specifications of EP-A-0 460 481, substituted monocarbodiimides or oligomeric substituted polycarbodiimides having terminal isocyanate groups are used which are prepared from substituted diisocyanates and that virtually do not release toxic volatile substances originating from the carbodiimides used either when hot, for example under the conventional processing conditions, or at room temperature. Polycarbodiimides of this type have higher melting points or cannot be melted and can be introduced into the polyurethanes and/or their parent substances only with an appreciable expenditure in terms of apparatus and time. The distribution of the polycarbodiimides in the ester-group-containing plastics is, therefore, often insufficiently homogeneous so that the stabilizer action does not meet the expectations.

More readily melting polycarbodiimide derivatives can be obtained by converting some of the terminal isocyanate groups into urethane groups, for example in accordance with DE-A-22 48 751 or U.S. Pat. No. 2,941,983.

Because of the statistical occurrence of monocarbodiimides and short-chain homologues, there is also in these compounds the tendency to form cleavage products that have low vapor pressure and a high tendency to migrate in the plastic and that tend to outgas at the higher processing temperatures.

In polymers that are incapable of forming hydrogen bridge bonds, such as polyesters and polycarbonates, the terminally masked urethane groups bring about incompatibility effects that limit their effectiveness.

SUMMARY OF THE INVENTION

The object of the present invention was to eliminate the above-mentioned disadvantages entirely or at least partly and to provide hydrolysis protection agents that have a high efficiency at low dosage in ester-group-containing polymers, that are nontoxic, that have a high thermal stability, that do not release toxic cleavage products when exposed to heat and that have good compatibility with the polymer matrix and do not therefore, effloresce out of the ester-group-containing polymers.

DETAILED DESCRIPTION OF THE INVENTION

Surprisingly, this object was achieved by using polycarbodiimide-based block copolymers of formula (I)

(I), in which

X is identical or different and is selected from —NHCO—R, —NHCONH—R, —NHCOO—R, —NHCOS—R, —COO—R, —O—R, —NR$_2$, —S—R, —OH, —NH$_2$, —NHR, S—H, and —NCO, but preferably stands for —NHCONH—R, —NHCOO—R, —OH, and wherein the group R denote an alkyl, cycloalkyl, aralkyl or aryl radical containing 1 to 30, preferably 2 to 18, carbon atoms, m, n are, independently of one another an integer from 1 to 1000, preferably from 5 to 200, o is an integer from 1 to 500, preferably from 3 to 100, A is selected from the carbodiimides or polycarbodiimides of formula (II)

(II), in which

Y is selected from ortho- or bisortho-substituted aromatics, aralkylenes in which the carbon atom linked to the carbodiimide group is substituted by C$_1$- to C$_{14}$-alkyl groups, and cycloalkylenes in which the carbon atom linked to the carbodiimide group is substituted by C$_1$- to C$_{14}$-alkyl groups, and B is selected from the group comprising (poly)dioles, (poly)diamines, (poly)dimercaptans, (poly)aminoalcohols, (poly)aminomercaptans and (poly)mercaptoalcohols.

The invention furthermore provides a method of preparing the block copolymers according to the invention and the use of the block copolymers according to the invention as stabilizers to prevent the hydrolytic degradation of ester-group-containing polymers.

To prepare the polycarbodiimides (component A, formula II) incorporated in the block copolymers according to the invention of formula (I), diisocyanates can be condensed as starting compounds at elevated temperatures, for example at 40 to 200° C., in the presence of catalysts with the release of carbon dioxide. Suitable methods are described in DE-A-11 30 594. Strong bases or phosphorous compounds, for example, have proved satisfactory as catalysts. Phospholene oxides, phospholidines and phospholine oxides are preferably used. Suitable for preparing the component A according to the invention are all diisocyanates, wherein aromatic diisocyanates substituted by $C_1$- to $C_4$-alkyl, such as 2,4,6-triisopropylphenyl 1,3-diisocyanate, 2,4,6-triethylphenyl 1,3-diisocyanate or 2,4,6-trimethylphenyl 1,3-diisocyanate, substituted diisocyanatodiphenyl-methanes, such as 2,4'-diisocyanato-diphenylmethane, 3,3',5,5'-tetraisopropyl-4,4'-diisocyanatodiphenylmethane or 3,3',5,5'-tetraethyl-4,4'-diisocyanatodiphenylmethane and substituted aralkyls, such as 1,3-bis(1-methyl-1-isocyanatoethyl) benzene, are preferably used. These diisocyanates can be used individually or as mixtures to prepare component A of formula (I).

The degree of polymerization or degree of condensation, respectively, m in the formula (I) can be adjusted by the choice of reaction conditions, such as reaction temperature, reaction time and amount of catalyst. This can easily be tracked by determining the NCO content or by the carbon dioxide evolved. Preferably, the degree of condensation is adjusted so that residual isocyanates in the range from 1 to 8 wt. % are still present in the polycarbodiimide (component A).

Dioles, diamines, dimercaptans, aminoalcohols, aminomercaptans, mercaptoalcohols or their polymerization products and mixtures thereof can be used as component B of the block copolymer (I) according to the present invention. Preferred dioles are 1,2-ethanediol, 1,4-butanediol, 2,2-bis(4-hydroxyphenyl)propane, poly(ether dioles) based on ethylene glycol, propylene glycol and tetramethylene glycol and mixtures thereof, poly(ester dioles) based on adipic acid, ethylene glycol, propylene glycol, butanediol and/or tetramethylene glycol, poly(ester dioles) based on ethylene glycol and phosphoric acid, dioles derived from polyolefins, for example from ethylene/butylene polymers. In particular, mention is made of, poly(ester dioles) based on adipic acid and ethane diole and poly(ether dioles) based on ethylene glycol or propylene glycol having a mean molecular weight in the range from 300 to 10,000 g/mol.

Preferred diamines are hexamethylenediamines, ethylenediamine and poly(ether amines) prepared by terminating polyethers with amines. Mention is made of poly(ether amines) based on propylene glycol and/or ethylene glycol having a mean molecular weight of 300 to 10,000 g/mol.

Preferred dimercaptans are 1,6-hexanedithiol, 1,12-dodecyldithiol, 1,18-octadecyidithiol and polyether/polydisulfides, so-called thiocols, having a mean molecular weight of 500 to 10,000 g/mol.

The preparation of the cited compounds of component B is generally known. Thus, for example, the synthesis of poly(ether dioles) is described in Kunststoff-Handbuch, vol. 7, $3^{rd}$ edition (1993), Hanser-Verlag, pages 58–65, and the synthesis of poly(ester dioles) is described in Kunststoff-Handbuch, vol. 7, $3^{rd}$ edition (1993), Hanser-Verlag, pages 67–71. The dioles mentioned therein are therefore the subject matter of the present invention.

The block copolymers according to the present invention are prepared by copolymerization of the two starting components A and B. In principle, the known polymerization methods, such as free-radical polymerization, cationic polymerization, anionic polymerization, polycondensation or polyaddition, can be used for this purpose. The block copolymers according to the present invention are preferably prepared by means of polyaddition of diisocyanates with dioles to form polyurethanes or with diamines to form polyureas, as described in Kunststoff-Handbuch, vol. 7, $3^{rd}$ edition (1993), Hanser-Verlag, pages 11–15. For this purpose, residual-isocyanates-containing polycarbodiimides of component A are reacted with terminal functional groups, i.e. amines or alcohols, at elevated temperature using a catalyst. The reaction temperature is in this case 30° to 200° C. The common polyurethane catalysts, for example tin(II) compounds, tin(IV) compounds or tertiary amines, such as those described in Kunststoff-Handbuch, vol. 7, $3^{rd}$ edition (1993), Hanser-Verlag, pages 104–110 can be used as catalyst. Dibutyltin dilaurate and/or triethylenediamine in concentrations of approximately 0.05 to 1 wt. % have proven to be particularly suitable.

The molar mass and, consequently, the degree of polymerization o and the terminal groups of the block copolymers according to the present invention can be adjusted by means of the stoichiometric composition. Preferred is a molar ratio of component A to component B in the range (0.7 to 1.3):1, in particular from (0.90 to 1.10):1.

The reaction of the two components can be performed in reactors typical of chemistry. Particularly suitable as reactors are stirred tanks, compounders, 2-component mixers, such as those described in Kunststoff-Handbuch vol. 7, $3^{rd}$ edition (1993), Hanser-Verlag, pages 143–147, and extruders.

The block copolymers produced in the reaction according to the present invention of components A and B still contain reactive terminal groups, such as isocyanate, amino, hydroxyl and mercapto groups, which can be reacted by common chemical methods with suitable functionalized alkyl, cycloalkyl, aralkyl or aral compounds containing 1 to 30 carbon atoms, preferably 2 to 18 carbon atoms, to form the desired end group X in formula (I).

The block copolymers according to the present invention of formula (I) have a mean molecular weight of approximately 1000 to 100,000 g/mol.

The block copolymers according to the present invention are eminently suitable as acid scavengers, in particular of organic acids, and are consequently preferably used as stabilizers to prevent the hydrolytic degradation of ester-group-containing polymers. In this connection, the group of polymers comprises both polycondensation products, for example polyesters, polyamides, polycaprolactones, polyester amides, polyether imides and polyether esters, and also polyaddition products, for example polyurethanes, polyureas and polyurea/polyurethane elastomers and free-radical prepared polymers, for example polyvinyl acetate and native polymers, for example, derivatives of cellulose and starch, in particular cellulose lactate.

The concentration of the block copolymers according to the present invention in the ester-group-containing polymers to be stabilized is, in general, 0.01 to 15 wt. %, preferably 0.1 to 5 wt. %, relative to the total mixture. In individual cases where the polymer is particularly stressed, the concentration may also be higher.

The block copolymers according to the present invention can be introduced into the ester-group-containing polymers to be stabilized by various methods. For example, the block copolymers according to the present invention can be blended with one of the educts that are used to prepare the polymers, for example the isocyanates or the polyols, or the block copolymers can be added directly to the reaction mixture during the preparation of the polyurethanes. Furthermore, the block copolymers according to the present invention can be added to the melt of the polymers in the final stage of reaction. According to a further procedure, the block copolymers according to the present invention can also be predispersed in a carrier material, such as, for example, thermoplastic molding compositions, in order subsequently to add these master batches present, as a rule, in solid granules to the final application.

EXAMPLES

1. Carbodiimide syntheses

Example 1

295.0 g (1.03 mol) of 2,4,6-triisopropylphenyl 1,3-diisocyanate having an NCO content of 29.5 wt. % are heated in the presence of 0.2 wt. % (0.59 g) of 1-methylphospholene 1-oxide in 200 ml of anhydrous xylene to 100° C. and condensed at this temperature with the release of carbon dioxide. After an NCO content in the reaction mixture of 5.0 wt. % has been reached (reaction time approximately 11 hours), the solvent, residual monomers and catalyst residues are distilled off in vacuo.

270.2 g of a mixture of oligomeric polycarbodiimides having an NCO content of 7.0 wt. % and a carbodiimide content of 12.6 wt. % are obtained. The structure of the compound was confirmed by an IR spectrum.

Example 2

500 g (1.2 mol) of 3,3',5,5'-tetraisopropyl-4,4'-diisocyanatodiphenylmethane having an NCO content of 19.3 wt. % are heated in the presence of 0.2 wt. % (1.0 g) of 1-methylphospholene 1-oxide in 500 ml of anhydrous xylene to 120° C. and condensed at this temperature with the release of carbon dioxide. After an NCO content in the reaction mixture of 2.9 wt. % has been reached (reaction time approximately 10 hours), the solvent, residual monomers and catalyst residues are distilled off in vacuo.

280 g of a mixture of oligomeric polycarbodiimides having a NCO content of 2.3 wt. %, a carbodiimide content of 9.4 wt. %, a glass transition point of 58° C. and a mean molar mass of 3200 g/mol, measured by means of gel permeation chromatography (GPC) are obtained. The structure of the compound was confirmed by an IR spectrum.

Example 3

300 g (1.24 mol) of 1,3-bis (1-methyl-1-isocyanatoethyl) benzene having an NCO content of 34.3 wt. % are heated in the presence of 0.2 wt. % (0.6 g) of 1-methylphospholine 1-oxide in the absence of solvent to 180° C. and condensed at this temperature with the release of carbon dioxide. After an NCO content in the reaction mixture of 8.8 wt. % has been reached (reaction time approximately 15 hours), the residual monomers and catalyst residues are distilled off in vacuo.

215 g of a mixture of oligomeric carbodiimides having an NCO content of 8.4 wt. %, a carbodiimide content of 12 wt. % and an iodine color value, measured according to DIN 6162, of 12.0 are obtained. The structure of the compound was confirmed by an IR spectrum.

2. Block copolymer syntheses

Example 4

85 g of the oligomeric polycarbodiimides from Example 1 are homogenized in 100 ml of anhydrous toluene under nitrogen at 60° C. Then 16.3 g (0.14 mol) of powdered 2,2-bis(4-hydroxyphenyl)propane are added batchwise, followed by 1.5 g of catalyst, a 33% solution of triethylenediamine in dipropylene glycol. The mixture is boiled under reflux for 12 hours. The solvent is then distilled off in vacuo.

93 g of a brittle powder having an NCO content of 0 wt. %, a carbodiimide content of 10.6 wt. %, a glass transition point of 75.2° C. and a mean molecular weight of 5300 g/mol are obtained.

Example 5

100 g of the oligomeric polycarbodiimide from Example 2 are dissolved in 100 ml of anhydrous toluene under nitrogen. Then 29.4 g of Desmophen 1600 u, a linear polyester supplied by Bayer AG, having a hydroxyl number of 110.3 mg KOH/g and a viscosity of 220 mPa·s, measured at 23° C., and 0.3 g of the catalyst dibutyltin dilaurate are added and the reaction mixture is stirred for 3 hours at 80° C. The solvent is then distilled off in vacuo.

77.4 g of a brittle, amber-colored block copolymer having an NCO content of 0 wt. %, a carbodiimide content of 7.3 wt. % and a glass transition point of 36.3° C. are obtained.

Example 6

100 g of the oligomeric polycarbodiimide from Example 3 are introduced into a stirred vessel at 70° C. while stirring. Then 0.3 g of dibutyltin dilaurate and 64.7 g of molten polyethylene glycol (molar mass 600 g/mol, hydroxyl number 174.7 mg KOH/g) are added and the mixture is stirred vigorously for 5 min at 70° C. The stirrer is then removed and the highly viscous reaction mixture is annealed for 2 hours at 70° C. in a drying oven.

154 g of a highly viscous block copolymer having an NCO content of 0 wt. %, a carbodiimide content of 9.1 wt. %, a glass transition point of −26° C. and a mean molar mass of 9000 g/mol are obtained.

Example 7

168.1 g of a diole composed of a copolymer of ethylene and butylene and having a viscosity, measured at 25° C., of 50,000 cps and a hydroxyl number of 33.8 mg KOH/g are introduced into a flask at 50° C. 50 g of the oligomeric polycarbodiimide from Example 1c and 0.65 g of dibutyltin dilaurate are now added while stirring. The reaction mixture is then heated for 2 hours at 100° C.

215 g of a highly viscous block copolymer having an NCO content of 0 wt. %, a carbodiimide content of 3.4 wt. %, a glass transition point of −55.3° C. and a mean molar mass of 8,400 g/mol are obtained.

Example 8

116 g of a polyester polyol composed of adipic acid and butanediol having a hydroxyl number of 48.9 mg KOH/g are introduced at a temperature of 60° C. into a discontinuous twin-screw compounder having a screw geometry of 42:6 D. Then 0.8 g of dibutyltin dilaurate and 49 g of the oligomeric polycarbodiimide from Example 3 are added to the twin-screw compounder via the feed end. The reaction is terminated after 30 min and the reaction mixture is discharged from the compounder via an outlet in the front plate.

150 g of a block copolymer having an NCO content of 0 wt. %, a carbodiimide content of 4.4 wt. %, a melting point of 52° C. and a mean molar mass of 4000 g/mol are obtained.

Example 9

346.5 g of the oligomeric polycarbodiimide from Example 3 are introduced at 60° C. into a stirred vessel while stirring. Then 3.2 g of triethylenediamine and 49.5 g of 1,6-hexanedithiol are added. The mixture is stirred for 6 hours at 60° C.

391 g of a highly viscous block copolymer having an NCO content of 0 wt. %, a carbodiimide content of 13.0 wt. %, a glass transition point of 10° C. and a mean molar mass of 17,000 g/mol are obtained.

Example 10

85.0 g of the oligomeric polycarbodiimide from Example 1 are homogenized at 50° C. in 200 ml of anhydrous toluene under nitrogen. Then 17.1 g of a poly(ether diamine) composed of poly(propylene glycol) having an amine number of 304.6 mg HCl/g are added dropwise in the course of 15 min. The mixture is then stirred for 1 hour at 60° C. The solvent is then distilled off in vacuo.

81.7 g of a brittle powder having an NCO content of 0 wt. %, a carbodiimide content of 10.5 wt. % and a glass transition point of 122.7° C. are obtained.

Example 11

100 g of the oligomeric polycarbodiimide from Example 3 are introduced at 60° C. into a stirred vessel while stirring. Then 0.2 g of dibutyltin dilaurate and 9.2 g of 1,4-butanediol are added and the mixture is stirred vigorously for 20 min at 60° C.

108 g of a hard block copolymer having an NCO content of 0 wt. %, a carbodiimide content of 13.7 wt. %, a glass transition point of 18° C. and a mean molar mass of 12,150 g/mol are obtained.

Example 12

350 g of the oligomeric polycarbodiimide from Example 3 are introduced at 90° C. into a stirred vessel while stirring. Then 1.3 g of triethylenediamine and 76.7 g of 2,2-bis(4-hydroxyphenyl)propane are added and the reaction mixture is stirred for 4 h at 10° C.

426 g of a brittle block copolymer having an NCO content of 0 wt. %, a carbodiimide content of 12.2 wt. %, a glass transition point of 25° C. and a mean molar mass of 3756 g/mol are obtained.

3. Application examples

Example 13

The block copolymers according to the invention from Examples 4 and 5 are ground and then incorporated in unstabilized, dried and ground polyethylene terephthalate (PET) having a density of 1.41 g/cm³, a mean molar mass of 62,000 g/mol and an intrinsic viscosity of 0.82 dl/g. The concentration in the mixture is 2 wt. % in each case. As a comparison example, on the one hand, pure ground PET is processed further and, on the other hand, ground PET containing 2 wt. % of a commercially obtainable polycarbodiimide based on 2,4,6-triisopropylphenyl 1,3-diisocyanate having a carbodiimide content of 13.5 wt. %.

F-3 standard rods are prepared by the injection molding method from the mixtures by means of a conventional injection-molding machine at a processing temperature of 255° C. The test rods are then aged with steam for 2 days in an autoclave at 120° C.

Finally, the aged test rods are tested by means of a tensile test with regard to elongation at break and ultimate tensile strength.

| Specimen | Example 4 | Example 5 | Comparison Example 14 | Comparison Example 15 |
|---|---|---|---|---|
| Description of the active ingredient | Block copolymer | Block copolymer | no active ingredient | Polycarbodiimide |
| NCN content [wt. %] | 10.6 | 7.3 | — | 13.5 |
| Dosage [wt. %] | 2 | 2 | — | 2 |
| Incorporation behavior | very good | very good | — | good |
| Odor nuisance | low | low | none | strong |
| Ultimate tensile strength before aging [N/mm²] | 67.2 | 66.5 | 68.3 | 66.4 |
| Elongation at break before aging [%] | 6.0 | 6.0 | 6.0 | 6.1 |
| Ultimate tensile strength after aging [N/mm²] | 65.6 | 50.2 | 16.6 | 55.2 |
| Elongation at break after aging [%] | 5.1 | 3.8 | 1.8 | 3.9 |

The application example makes it clear that the block copolymers according to the invention have a better or equal stabilizing action against the hydrolytic degradation in PET. Simultaneously, the incorporation behavior of the block copolymers according to the present invention is good and no odor nuisance is exhibited during processing.

Example 16

The block copolymers according to the invention from Examples 11 and 12 are ground and then incorporated in unstabilized, dried and ground thermoplastic polyurethane (TPU), polyester/polyurethane having a density of 1.2 g/cm³ and a Shore-A hardness of 84. The concentration in the mixture is 2 wt. % in each case. As a comparison example, on the one hand, pure ground TPU is processed further and, on the other hand, ground TPU containing 2 wt. % of a commercially obtainable carbodiimide based on 2,6-diisopropylphenyl isocyanate having a carbodiimide content of 10.5 wt. % are processed further.

F-3 standard rods are prepared by the injection molding method from the mixtures by means of a conventional injection-molding machine at a processing temperature of 190° C. The test rods are then aged with steam for 4 days in an autoclave at 100° C.

Finally, the aged test rods are investigated by means of a tensile test with regard to elongation at break and ultimate tensile strength.

| Specimen | Example 11 | Example 12 | Comparison Example 17 | Comparison Example 18 |
|---|---|---|---|---|
| Description of the active ingredient | Block copolymer | Block copolymer | no active ingredient | Carbodiimide |
| NCN content [wt. %] | 13.7 | 12.2 | — | 10.5 |
| Dosage [wt. %] | 2 | 2 | — | 2 |
| Incorporation behavior | very good | very good | — | very good |
| Odor nuisance | low | low | none | strong |
| Ultimate tensile strength before aging [N/mm$^2$] | 12.6 | 12.8 | 13.7 | 12.0 |
| Elongation at break before aging [%] | 536 | 535 | 535 | 536 |
| Ultimate tensile strength after aging [N/mm$^2$] | 13.5 | 13.1 | 6.0 | 7.6 |
| Elongation at break after aging [%] | 536 | 531 | 18.3 | 22.8 |

The application example makes it clear that the block copolymers according to the invention have a better stabilizing action against hydrolytic degradation in TPU. At the same time, the incorporation behavior of the block copolymers according to the invention is very good and no odor nuisance is manifested during the processing.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. Polycarbodiimide-based block copolymers of formula (I),

$$X-[-(A)_m-(B)_n-]_o-X \qquad (I),$$

wherein

X is identical or different and is selected from the group consisting —NHCO—R, —NHCONH—R, —NHCOO—R, —NHCOS—R, —COO—R, —O—R, —NR$_2$, —S—R, —OH, —S—H, —NH$_2$, —NHR and —NCO, and wherein the group R denote an alkyl, cycloalkyl, aralkyl or aryl radical containing 1 to 30 carbon atoms, m, n are, independently of one another an integer from 1 to 1000, o is an integer from 1 to 500, A is selected from the group consisting of the carbodiimides or polycarbodiimides of formula (II)

$$-(-N=C=N-Y-)- \qquad (II),$$

wherein

Y is selected from the group consisting of ortho- or bisortho-substituted aromatics, aralkylenes in which the carbon atom linked to the carbodiimide group is substituted by C$_1$- to C$_{14}$-alkyl groups, and cycloalkylenes in which the carbon atom linked to the carbodiimide group is substituted by C$_1$- to C$_{14}$-alkyl groups, and B is selected from the group consisting of (poly)dioles, (poly)diamines, (poly)dimercaptans, (poly)aminoalcohols, (poly)aminomercaptans and (poly)mercaptoalcohols.

2. Block copolymers according to claim 1, in which Y in formula (II) denotes a block based on 2,4,6-triisopropylphenyl 1,3-diisocyanate.

3. Block copolymers according to claim 1, in which Y in formula (II) denotes a block based on 1,3-bis(1-methyl-1-isocyanatoethyl)benzene.

4. Block copolymers according to claim 1, in which Y in the Formula (II) denotes a block based on 3,3',5,5'-tetraisopropyl-4,4'-diisocyanatodiphenylmethane.

5. Block copolymers according to claim 1, wherein the components A and B of formula (I) are copolymerized in the presence of a catalyst at a reaction temperature of 30° to 300° C.

6. A hydrolysis stabilizer in ester-group-containing polymers comprising polycarbodiimide-based block copolymers of formula (I),

$$X-[-(A)_m-(B)_n-]_o-X \qquad (I),$$

wherein

X is identical or different and is selected from the group consisting —NHCO—R, —NHCONH—R, —NHCOO—R, —NHCOS—R, —COO—R, —O—R, —NR$_2$, —S—R, —OH, —NH$_2$, —NHR and —NCO, and wherein the group R denote an alkyl, cycloalkyl, aralkyl or aryl radical containing 1 to 30 carbon atoms, m, n are, independently of one another an integer from 1 to 1000, o is an integer from 1 to 500, A is selected from the group consisting of the carbodiimides or polycarbodiimides of formula (II)

$$-(-N=C=N-Y-)- \qquad (II),$$

wherein

Y is selected from the group consisting of ortho- or bisortho-substituted aromatics, aralkylenes in which the carbon atom linked to the carbodiimide group is substituted by C$_1$- to C$_{14}$-alkyl groups, and cycloalkylenes in which the carbon atom linked to the carbodiimide group is substituted by C$_1$- to C$_{14}$-alkyl groups, and B is selected from the group consisting of (poly)dioles, (poly)diamines, (poly)dimercaptans, (poly)aminoalcohols, (poly)aminomercaptans and (poly)mercaptoalcohols.

* * * * *